(12) United States Patent
Shimose (10) Patent No.: US 12,140,308 B2
(45) Date of Patent: Nov. 12, 2024

(54) BOILER EQUIPMENT AND ORGANIC WASTE TREATMENT SYSTEM INCLUDING THE SAME

(71) Applicant: Shimose Microbes Laboratory Corporation, Tokyo (JP)

(72) Inventor: Shinichi Shimose, Tokyo (JP)

(73) Assignee: Shimose Microbes Laboratory Corporation, Tokyo (JP)

( * ) Notice: Subject to any disclaimer, the term of this patent is extended or adjusted under 35 U.S.C. 154(b) by 478 days.

(21) Appl. No.: 17/610,309

(22) PCT Filed: May 25, 2020

(86) PCT No.: PCT/JP2020/020495
§ 371 (c)(1),
(2) Date: Nov. 10, 2021

(87) PCT Pub. No.: WO2020/241550
PCT Pub. Date: Dec. 3, 2020

(65) Prior Publication Data
US 2022/0243912 A1     Aug. 4, 2022

(30) Foreign Application Priority Data
May 27, 2019   (JP) ................. 2019-098623

(51) Int. Cl.
*F23G 5/04*     (2006.01)
*F23G 5/20*     (2006.01)
*F23G 5/46*     (2006.01)

(52) U.S. Cl.
CPC ............... *F23G 5/04* (2013.01); *F23G 5/46* (2013.01); *F23G 5/20* (2013.01); *F23G 2203/205* (2013.01)

(58) Field of Classification Search
CPC ............ F27B 17/0016; F23C 5/08; F23C 2900/05081; F23D 11/406; F23D 14/145;
(Continued)

(56) References Cited

U.S. PATENT DOCUMENTS

| | | | | |
|---|---|---|---|---|
| 3,822,651 A | * | 7/1974 | Harris ................. | F23G 5/46 |
| | | | | 432/116 |
| 4,398,998 A | * | 8/1983 | Quame ................ | B09B 3/00 |
| | | | | 110/259 |
| 4,531,479 A | * | 7/1985 | Gilbert ................ | F22B 37/78 |
| | | | | 122/504.2 |

FOREIGN PATENT DOCUMENTS

| | | |
|---|---|---|
| JP | S58-1323 B2 | 1/1983 |
| JP | 2007-319738 A | 12/2007 |

(Continued)

*Primary Examiner* — David J Laux
(74) *Attorney, Agent, or Firm* — Locke Lord LLP; James E. Armstrong, IV; Nicholas J. DiCeglie, Jr.

(57) ABSTRACT

Boiler equipment includes: a combustion device including a combustion chamber to combust fuel supplied to the combustion device; a combustion furnace including a combustion chamber formed inside thereof; and a heat exchanger transferring thermal energy obtained by combustion of the fuel in the combustion device to water. The combustion device is directly connected to a wall part of the combustion furnace such that the combustion chamber of the combustion device faces the combustion chamber of the combustion furnace. The fuel is efficiently combusted in the combustion chambers of the combustion device and the combustion furnace, which are integrated with each other. Thus, almost no ash is generated.

5 Claims, 7 Drawing Sheets

(58) Field of Classification Search
CPC . F23D 14/70; F23D 14/72; F23Q 9/00; F27D 2001/0059
See application file for complete search history.

(56) References Cited

FOREIGN PATENT DOCUMENTS

| | | |
|---|---|---|
| JP | 4153685 B2 | 9/2008 |
| JP | 2009-198090 A | 9/2009 |
| JP | 2010-096446 A | 4/2010 |
| JP | 2010-255887 A | 11/2010 |
| JP | 2019-056023 A | 4/2019 |

\* cited by examiner

BOILER EQUIPMENT AND ORGANIC WASTE TREATMENT SYSTEM INCLUDING THE SAME

TECHNICAL FIELD

The present invention relates to boiler equipment with improved combustion efficiency and an organic waste treatment system including the boiler equipment.

BACKGROUND ART

In conventional boiler equipment, a combustion furnace includes a combustion device such as a burner to combust small grain fuel in the combustion furnace. The boiler equipment is also provided with a heat exchanger to transfer thermal energy generated by the combustion to water.

When treating organic waste such as food waste, it is desirable to use, for example, a fermentation dryer disclosed in Patent Document 1 to ferment and decompose the organic waste and thus to obtain volume-reduced dried product. It is also desirable that the dried product is combusted as fuel in boiler equipment so that there remains almost no unburned material.

PRIOR ART DOCUMENTS

Patent Documents

Patent Document 1: JP 2007-319738 A
Patent Document 2: JP 4153685

SUMMARY OF THE INVENTION

Problem to be Solved by the Invention

However, the conventional boiler equipment generates a large amount of ash.

The present invention was made in consideration of the above circumstances, an object of which is to provide boiler equipment with high combustion efficiency that generates almost no unburned material (ash) when the boiler equipment combusts not only organic waste but also various kinds of fuel.

Means for Solving the Problem

In order to achieve the above object, a boiler equipment of the present invention includes: a combustion device including a combustion chamber to combust fuel supplied to the combustion device; a combustion furnace including a combustion chamber formed inside thereof; and a heat exchanger transferring thermal energy obtained by combustion of the fuel in the combustion device to water. The combustion device is directly connected to a wall part of the combustion furnace such that the combustion chamber of the combustion device faces the combustion chamber of the combustion furnace.

With the present invention, since the fuel is efficiently combusted in the combustion chambers of the combustion device and the combustion furnace, which are integrated with each other. Thus, almost no ash is generated.

In the present invention, it is preferable that the heat exchanger includes: a steam-water drum disposed above the combustion chamber of the combustion furnace; a water drum disposed at a position higher than an opening part of the wall part of the combustion furnace to which the combustion chamber of the combustion device is opened; and a water tube system in which a first end part thereof is connected to the steam-water drum while a second end part thereof is connected to the water drum at the position of the water drum in the height direction. With this configuration, it is possible to simplify the overall layout while including the water drum in the heat exchanger. Thus, it is possible to efficiently convert the combustion energy of fuel into steam using a sufficient amount of water.

Also in the present invention, it is preferable that the water tube system includes: a large number of first water tubes provided on an inner wall surface of the combustion chamber of the combustion furnace so as to extend vertically; second water tubes through which water supplied from an outside to the steam-water drum flows downward; third water tubes horizontally provided at the position of the water drum in the height direction so as to flow the water that has flowed through the second water tubes to the first water tubes; and fourth water tubes through which part of the water that has flowed through the third water tubes further flows to the water drum. With this configuration, it is possible to give the combustion energy to the large amount of water in the combustion chamber of the combustion furnace without any water feed pump being provided in the heat exchanger, which results in efficient generation of steam.

Furthermore in the present invention, it is preferable that the combustion device is directly connected to a vertical wall of the combustion furnace. Also, in the wall part of the combustion furnace, it is preferable that a gas discharge port is formed in a vertical wall opposite to the vertical wall to which the combustion device is directly connected, so that the gas discharge port discharges exhaust gas generated by combustion in the combustion chamber of the combustion furnace. With this configuration, it is possible that the combustion energy of the fuel is converted into steam in the heat exchanger while the whole combustion chamber in the combustion furnace is effectively used.

Furthermore, in the present invention, it is preferable that the combustion chamber of the combustion device includes: a primary combustion chamber in which the fuel supplied is subjected to primary combustion; a secondary combustion chamber in which the fuel that has been subjected to the primary combustion in the primary combustion chamber is subjected to secondary combustion; and an air supply port through which air is supplied to the secondary combustion chamber independently of air supplied to the primary combustion chamber. With this configuration, it is possible to supply a large amount of air to the secondary combustion chamber of the combustion device and the combustion chamber of the combustion furnace that forms an integrated space with the secondary combustion chamber, which results in the secondary combustion of the fuel being performed at a high temperature. Thus, the secondary combustion is optimally performed.

Also, the present invention preferably includes the boiler equipment, and a fermentation dryer configured to: store an object to be treated, which contains organic waste, in an airtight container; heat and stir the object to be treated under reduced pressure so that a temperature of the object to be treated is within a predetermined temperature range; ferment organic matter using microorganisms; and obtain volume-reduced dried product, an odor component of which has been decomposed. Also, it is preferable that the dried product obtained by the fermentation dryer is supplied, as fuel, to the combustion chamber of the combustion device in the boiler equipment. With this configuration, since the dried product obtained by the fermentation dryer can be combusted and incinerated in the boiler equipment, there is no need to have the step of waste disposal.

Also the present invention preferably includes a steam electric generator that generates electricity by steam extracted from the steam-water drum of the boiler equipment. It is also preferable that the fermentation dryer is driven by the electricity obtained by the steam electric generator. With this configuration, since part of the electric power used for driving the fermentation dryer is covered by the thermal energy obtained by combustion of the dried product, the costs for driving the fermentation dryer can be reduced.

Effect of the Invention

With the boiler equipment and the organic waste treatment system of the present invention, it is possible to further improve combustion efficiency of fuel so that almost no ash remains.

MODE FOR CARRYING OUT THE INVENTION

Figure 1:
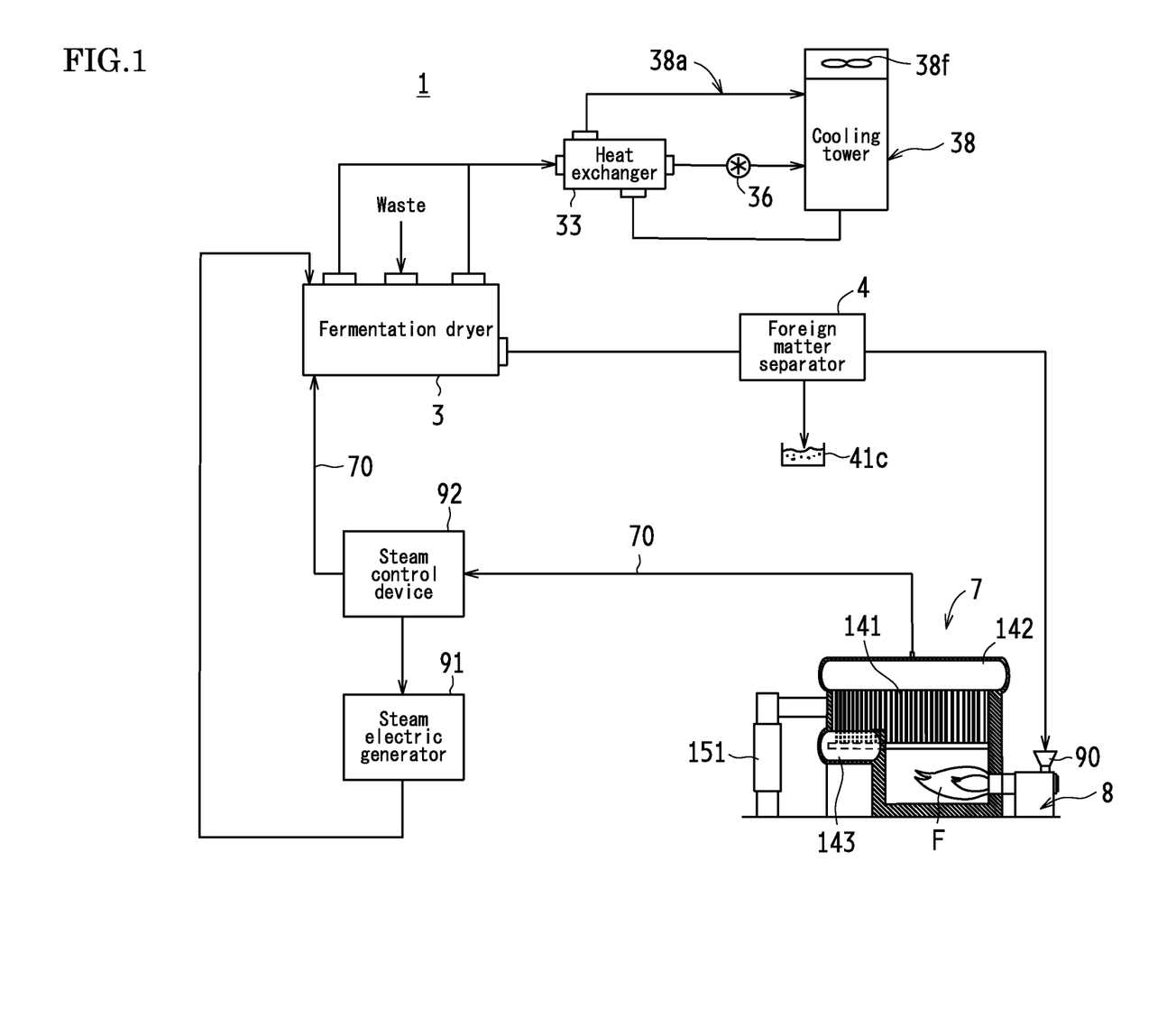
FIG. 1 is a block diagram indicating an overall configuration of an organic waste treatment system including boiler equipment according to an embodiment of the present invention.

Hereinafter, an embodiment of the present invention will be described with reference to the drawings. FIG. 1 is a block diagram indicating an overall configuration of an organic waste treatment system including boiler equipment according to the embodiment of the present invention.

An organic waste treatment system 1 shown in FIG. 1 includes: a fermentation dryer 3; a foreign matter separator 4; a steam boiler 7; and a steam electric generator 91. The object to be treated by the fermentation dryer 3 is organic food waste discharged from houses or organic waste discharged from various plants. In the fermentation dryer 3, the organic waste is subjected to fermentation drying under reduced pressure as described in detail later. Dried product obtained by fermentation drying under reduced pressure is transported to the foreign matter separator 4 so as to remove foreign matters such as metals mixed with the dried product. After the foreign matters are removed, the dried product is supplied, as fuel, to the steam boiler 7 so as to be combusted. Electricity is generated by the steam electric generator 91 using combustion energy, and part of thus generated electricity is used to drive the fermentation dryer 3.

Here, the configuration of the fermentation dryer 3 is described.

Fermentation Dryer

The fermentation dryer 3 is a publicly known apparatus that is described, for example, in Patent Document 1. As described hereinafter, the fermentation dryer 3 is to heat and stir organic waste as the object to be treated under reduced pressure so that the temperature of the organic waste is within a predetermined temperature range, and to ferment organic matter using microorganisms. Thus, volume-reduced dried product is obtained.

Figure 2:
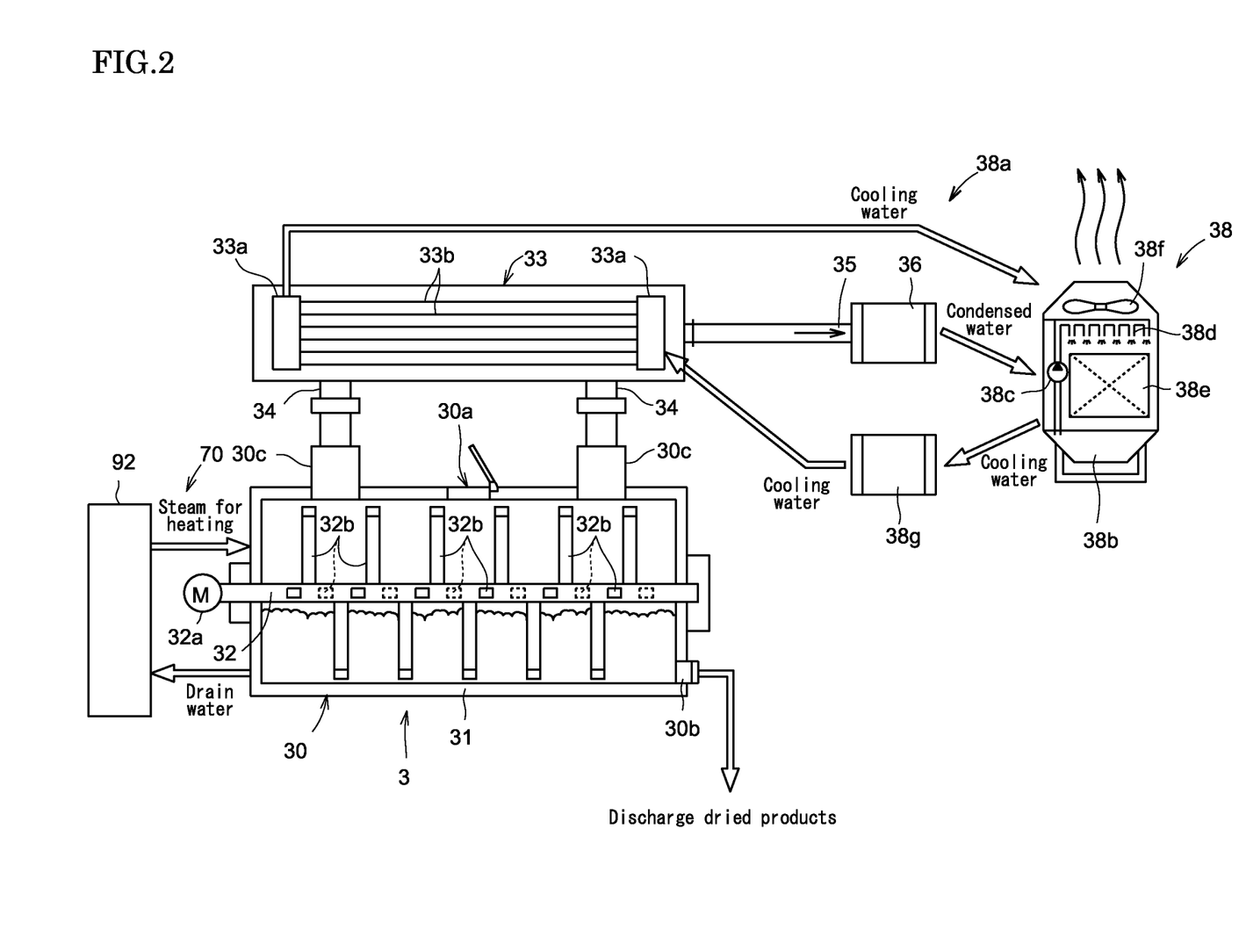
FIG. 2 is a diagram schematically illustrating a general configuration of a fermentation dryer provided in the treatment system.

As schematically shown in FIG. 2, the fermentation dryer 3 includes, as an airtight container to house waste such as plastic, a cylinder-shaped tank 30 formed to have airtightness such that the pressure inside the tank 30 is maintained to be equal to or lower than the atmospheric pressure. A heating jacket 31 is provided on a peripheral wall of the tank 30. Steam for heating is supplied to the heating jacket 31 from the steam boiler 7 via a steam control device 92.

In the tank 30, a stirring shaft 32 is disposed so as to extend in the longitudinal direction (left and right direction in FIG. 2) while it is surrounded by the heating jacket 31. The stirring shaft 32 is rotated by an electric motor 32a at a predetermined rotational speed. The stirring shaft 32 includes a plurality of stirring blades 32b that is separated from each other in the shaft direction. With the above configuration, the waste is stirred, and then transported, after termination of the fermentation drying, toward the longitudinal direction of the tank 30. In place of the electric motor 32a, a hydraulic motor may be used.

More specifically, a feeding hole 30a for the waste is provided in an upper part of the tank 30, at a center thereof in the longitudinal direction (i.e. at the center in FIG. 2). The waste that is fed through the feeding hole 30a is heated by the heating jacket 31 while stirred by the rotation of the stirring shaft 32, as described above. After elapse of a predetermined period of time, dried product is discharged from a discharge section 30b provided in a lower part of the tank 30.

In this embodiment, a steam path is also formed inside of the stirring shaft 32, although it is not shown in detail in the drawings. To this steam path, the steam for heating is supplied from the steam control device 92 via a steam path 70. In this way, the stirring shaft 32 stirs the waste while heating the waste by the heat from the inside thereof. Drain water made from condensed steam is returned to the steam control device 92 via the steam path 70.

On the upper part of the tank 30 in which the waste is heated, guiding sections 30c, which guide steam generated from the heated waste to a condensing section 33, are provided so as to protrude from the tank 30. The guiding sections 30c are respectively provided at one end and the other end of the tank 30 in the longitudinal direction. The condensing section 33 includes a plurality of cooling tubes 33b held by a pair of heads 33a. A cooling channel 38a is provided between the set of cooling tubes 33b and a cooling tower 38 described later.

The cooling tower 38 includes: a water receiving tank 38b into which cooling water discharged from the condensing section 33 flows; a drawing pump 38c that draws the cooling water from the water receiving tank 38b; and a nozzle 38d that sprays the drawn cooling water. The cooling water sprayed from the nozzle 38d flows downward through a downward flowing section 38e with being blown by a fan 38f, which lowers the temperature of the cooling water. Then, the cooling water flows again into the water receiving tank 38b.

In this way, the cooling water cooled by the cooling tower 38 is transported by a cooling water pump 38g and is returned to the condensing section 33 via the cooling channel 38a. During passing through the plurality of cooling tubes 33b, the temperature of the cooling water is increased by heat exchange with the steam generated from the waste, as described above. Then, the cooling water is once again returned to the cooling tower 38 via the cooling channel 38a. That is, the cooling water circulates through the cooling channel 38a between the condensing section 33 and the cooling tower 38.

Apart from the circulating cooling water, steam-condensed water also flows into the cooling tower 38, which is generated by the heated waste and condensed in the condensing section 33. That is, the condensed water generated in the condensing section 33 is retained in the condensing section 33 and in a communication passage 35. In this embodiment, a vacuum pump 36 is connected to the condensing section 33 via the communication passage 35 so as to reduce the pressure in the tank 30.

Thus, when the vacuum pump 36 operates, air and condensed water are drawn from the condensing section 33 via the communication passage 35, and furthermore air and steam in the tank 30 are drawn to the condensing section 33 via the guiding sections 30c and communication passages 34. Accordingly, the condensed water is drawn from the condensing section 33 by the vacuum pump 36, and guided from the vacuum pump 36 to the water receiving tank 38b of the cooling tower 38 via a first water conduit.

Then, the condensed water introduced in the water receiving tank 38b of the cooling tower 38 is mixed with the cooling water. The mixed cooling water is drawn, as described above, by the drawing pump 38c so as to be sprayed by the nozzle 38d. After being sprayed, the cooling water flows downward through the downward flowing section 38e while being cooled. Since the condensed water contains the same microorganisms as those added to the waste in the tank 30, an odor component or the like contained in the condensed water has been decomposed. Thus, the odor is not emitted outside.

Operations of Fermentation Dryer

Here, operations of the above-configured fermentation dryer 3 are described. The organic waste stored in the tank 30 is heated by steam for heating supplied to the heating jacket 31 (and the steam paths such as the stirring shaft 32) while being stirred by the rotation of the stirring shaft 32. The temperature of the steam for heating that is supplied from the steam control device 92 is preferably about 140° C.

The waste is heated from the outside by the heating jacket 31 surrounding the inside of the tank 30 as well as heated from the inside by the stirring shaft 32 and the like. Thus, the temperature of the waste is effectively increased while the waste is stirred by the stirring shaft 32. Furthermore, since the pressure in the tank 30 is reduced due to operations of the vacuum pump 36, the boiling point is reduced in the tank 30, which promotes evaporation of water, and as a result, promotes fermentation drying.

It is preferable that the fermentation drying step by the fermentation dryer 3 takes, for example, 2 hours as one step. First, the waste is fermented for 30 minutes. When the inside of the tank 30 is decompressed to −0.06 to −0.07 MPa (gauge pressure, hereinafter this unit name is omitted), the water temperature inside of the tank 30 is maintained at 76 to 69° C. (saturated steam temperature). As a result, the fermentation and the decomposition of the waste is mainly promoted by the microorganisms described below.

Next, the fermenting waste is dried for 1.5 hours. For this purpose, the inside of the tank 30 is further decompressed to −0.09 to −0.10 MPa, thus the water temperature inside of the drum is maintained at 46 to 42° C. (saturated steam temperature). As a result, the drying of the organic waste is sufficiently promoted. As to the microorganisms added to the organic waste in the tank 30 at the time of drying treatment, it is preferable to use complex effective microorganisms, which are cultured in advance using a plurality of kinds of native microorganisms as a base, as described in Patent Document 2. That is, groups of so-called SHIMOSE 1, SHIMOSE 2 and SHIMOSE 3 have the majority of the colony.

Here, SHIMOSE 1 has the accession number FERM BP-7504 (internationally deposited with the Patent Microorganisms Depository of the National Institute of Advanced Industrial Science and Technology and the National Institute of Bioscience and Human-Technology of the Ministry of Economy, Trade and Industry (1-1-3 Higashi, Tsukuba, Ibaraki, Japan) on Mar. 14, 2003). Also, SHIMOSE 2 has the accession number FERM BP-7505 (internationally deposited in the same manner as SHIMOSE 1), which is microorganism belonging to the genus Pichiafarinosa having salt tolerance. SHIMOSE 3 has the accession number FERM BP-7506 (internationally deposited in the same manner as SHIMOSE 1), which is microorganism belonging to the genus *Staphylococcus*.

Foreign Matter Separator

Figure 3:
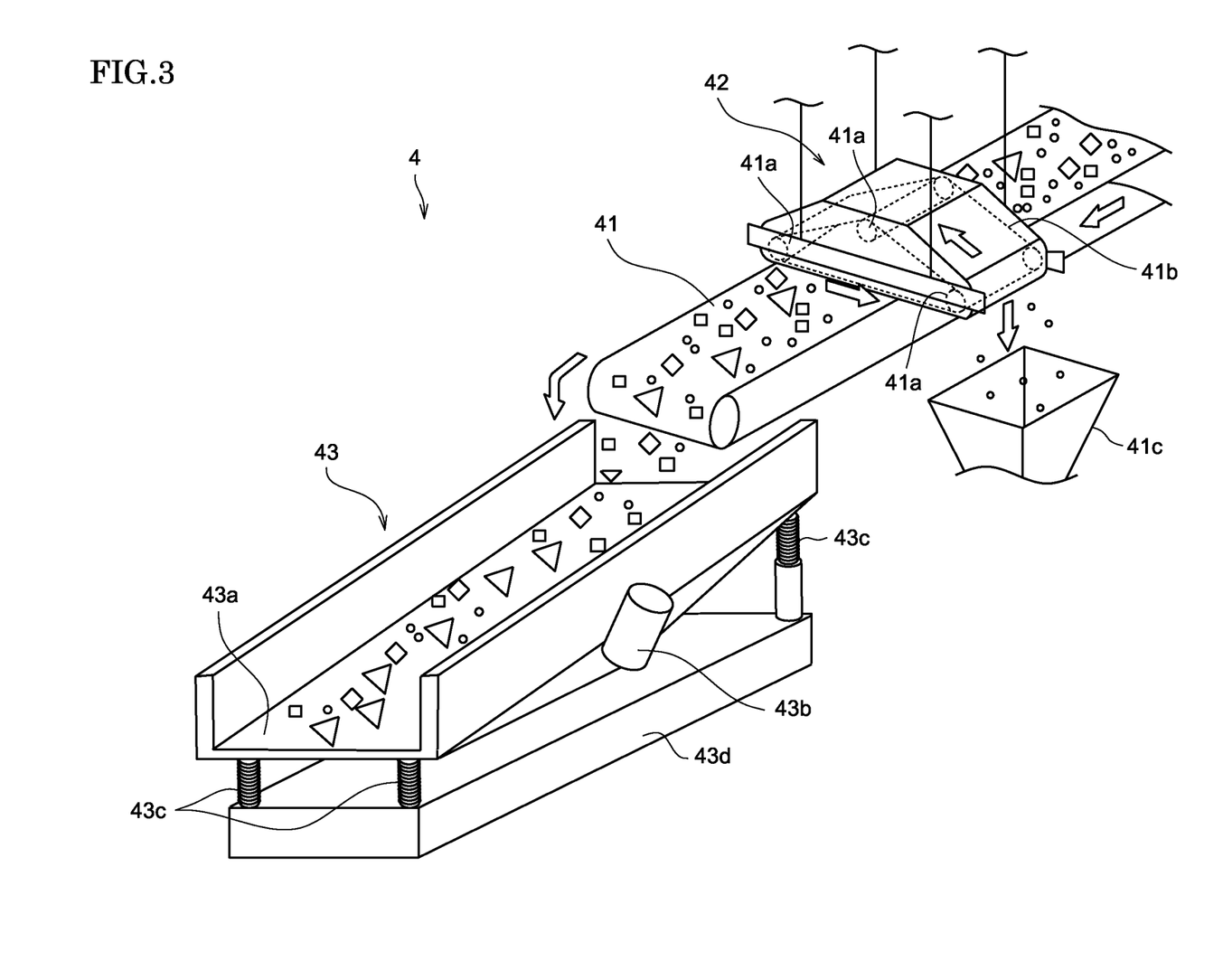
FIG. 3 is a perspective view schematically illustrating a configuration of a foreign matter separator provided in the treatment system.

As schematically shown in FIG. 3, a foreign matter separator 4 includes a magnetic separator 42 and a vibrating conveyor machine 43. The magnetic separator 42 is, for example, a hanging type device, and is hung above a discharge conveyor 41. The magnetic separator 42 attracts, by magnets, magnetic matter such as metal fittings and iron pieces (in FIG. 3, indicated as black circles) out of the dried product transported by the discharge conveyor 41, and to discharge continuously the attracted matter by a belt 41b that moves between respective pulleys 41a. Thus, the magnetic separator 42 removes the metals such as metal fittings and iron pieces that are mixed with the dried product.

The vibrating conveyor machine 43 includes a base surface 43a and a vibration motor 43b that vibrates the base surface 43a. The vibrating conveyor machine 43 is supported by a lower base 43d via a plurality of (for example, four) coil springs 43c. Also, the base surface 43a is provided in a state being inclined diagonally downward.

Like this, the vibration sieving machine 43 is supported by the coil springs 43c in a floating state with respect to the lower base 43d. Thus, the dried product from which the metals are removed by the magnetic separator 42 is vibrated, and transported forward and downward, by driving the vibration motor 43b. Then, the dried product is supplied to a fuel supply path 90 (see FIG. 1) of the steam boiler 7.

Steam Boiler

Figure 4:
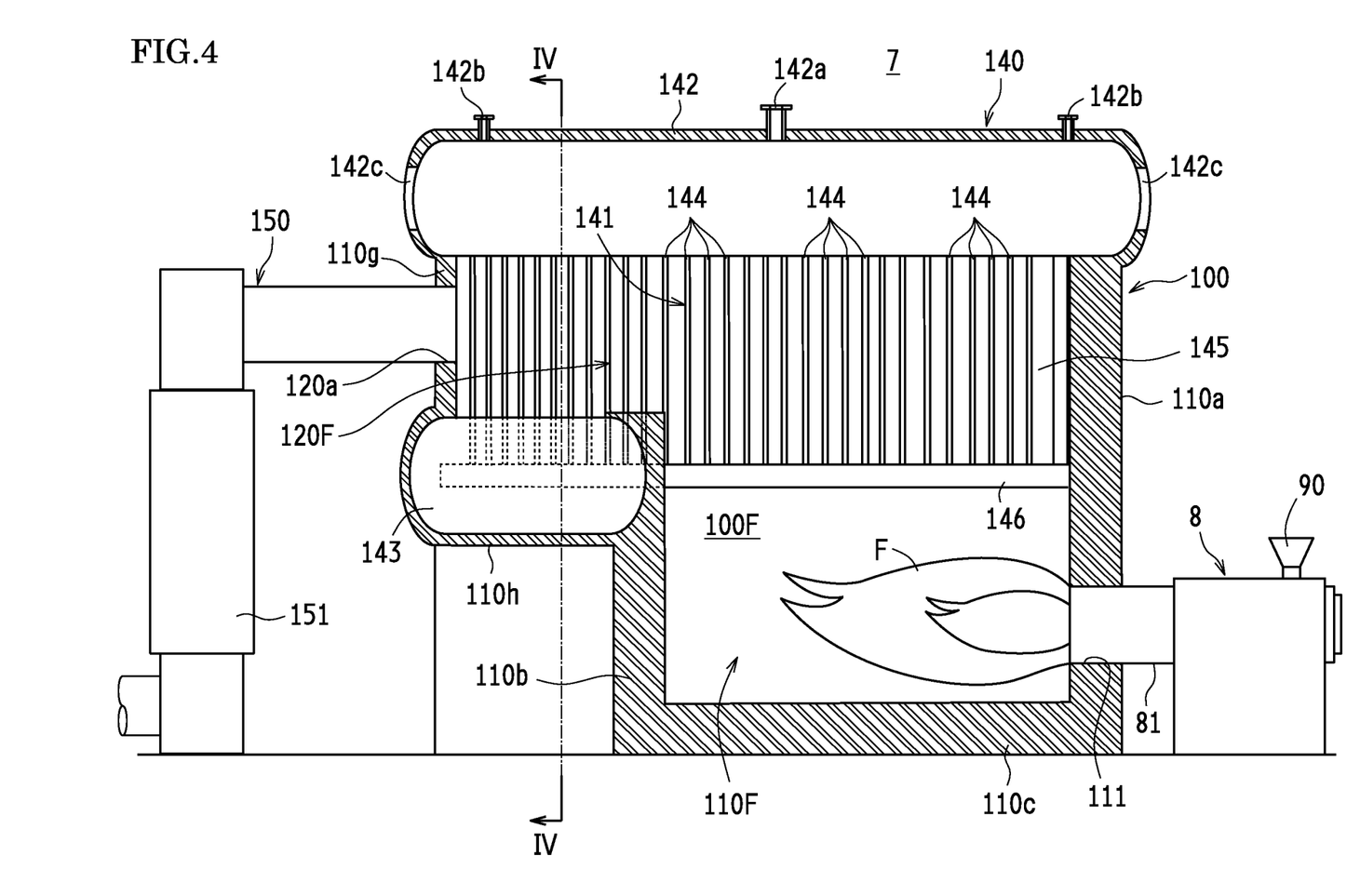
FIG. 4 is a cross-sectional view schematically illustrating a general configuration of boiler equipment according to the embodiment of the present invention.
Figure 6:
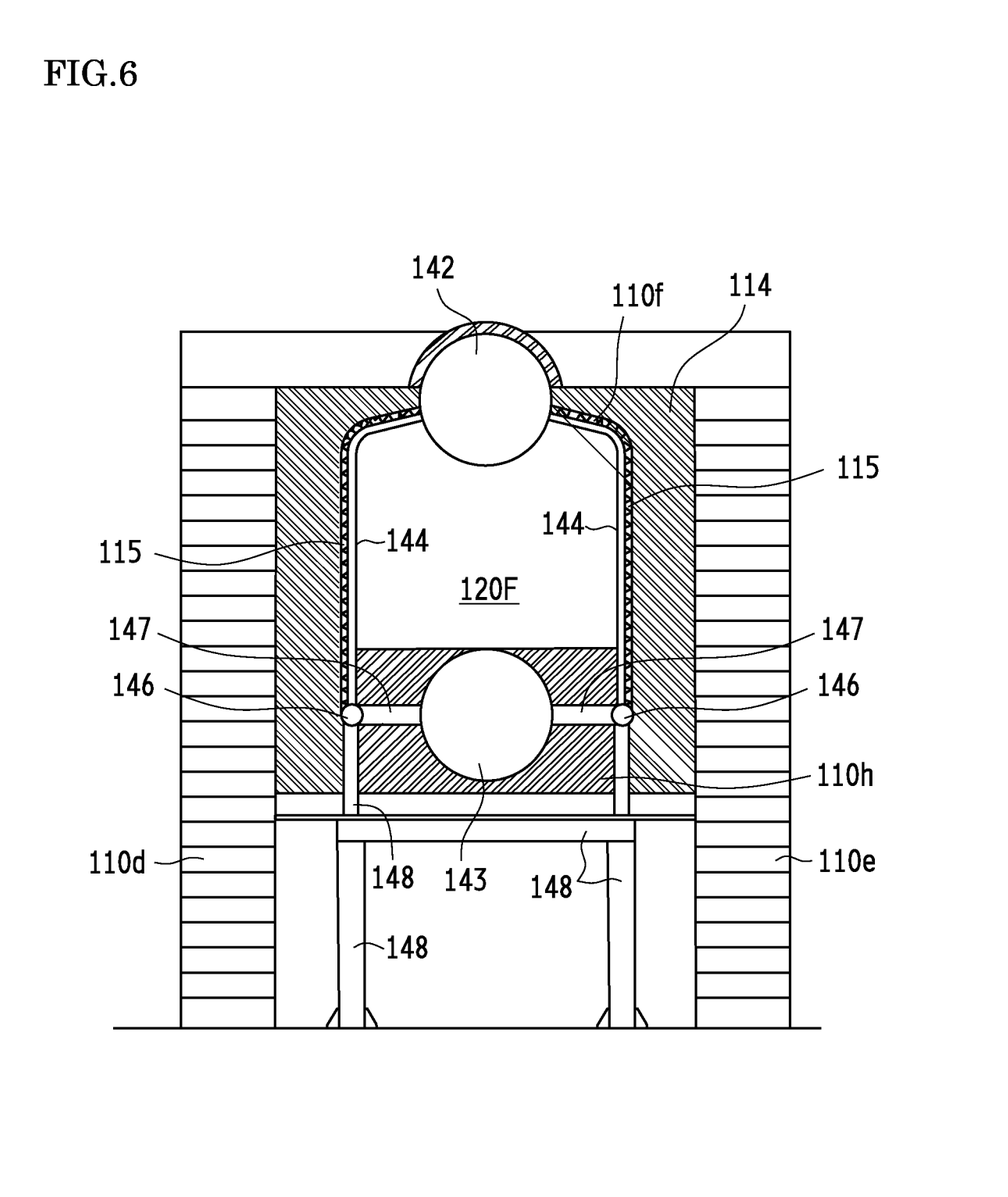
FIG. 6 is a cross-sectional view of the boiler equipment, which is taken along the line IV-IV of FIG. 4.

FIG. 4 is a vertical cross-sectional view illustrating a configuration of the steam boiler (boiler equipment) 7. FIG. 6 is a cross-sectional view of the steam boiler 7, which is taken along the line IV-IV of FIG. 4. The steam boiler 7 includes: a combustion furnace 100; a burner (combustion device) 8 disposed on the right side of the combustion furnace 100 in FIG. 4; and a heat exchanger 140 disposed in the combustion furnace 100. The configuration of the burner 8 is now described.

Burner

Figure 5:
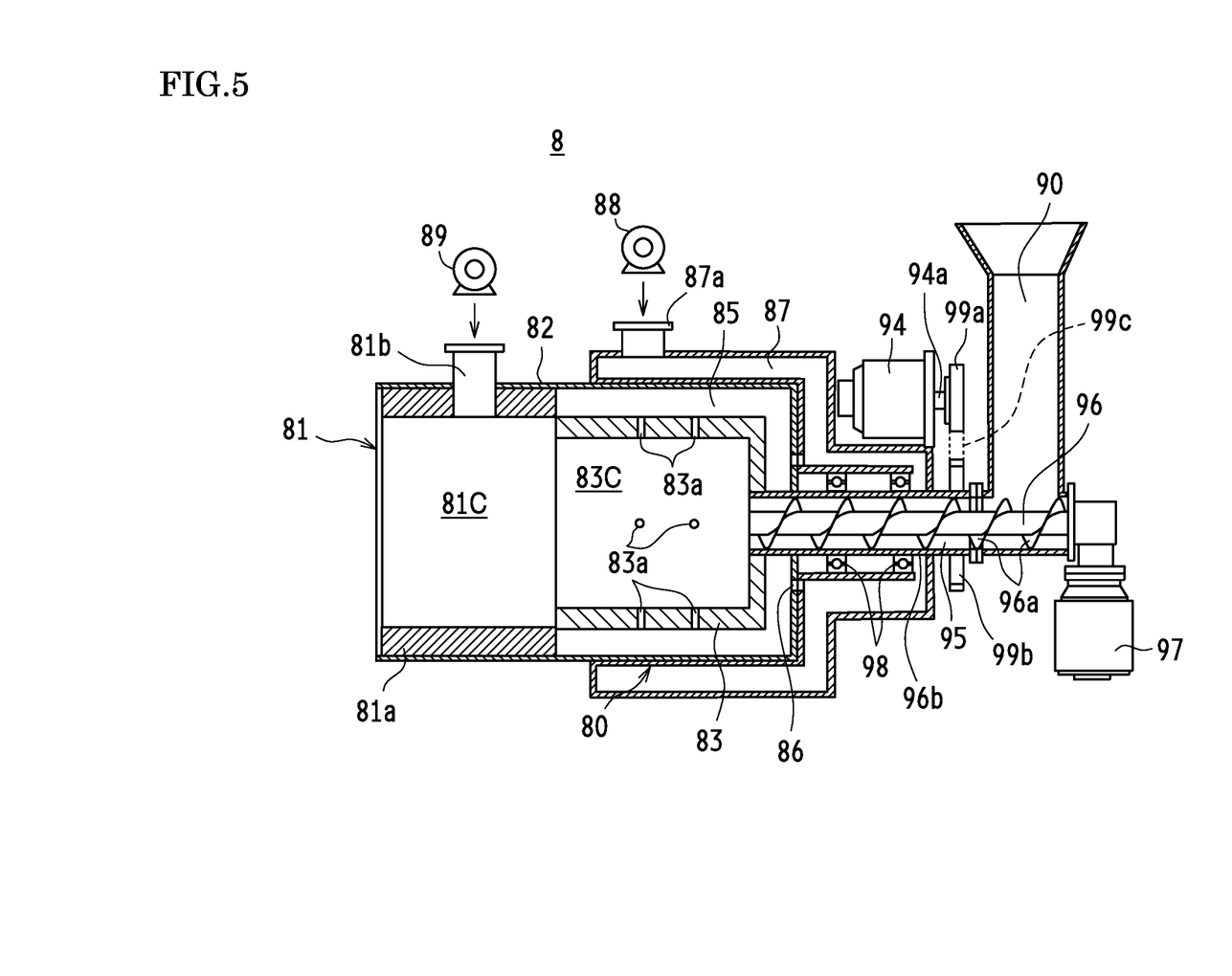
FIG. 5 is a cross-sectional view schematically illustrating a general configuration of a burner provided in the boiler equipment.

FIG. 5 is a longitudinal cross-sectional view illustrating the configuration of the burner 8. In FIGS. 4 and 5, the burner (combustion device) 8 combusts fuel that is the volume-reduced dried product (organic waste) treated by the fermentation dryer 3.

The burner 8 includes a cylinder body 80 and a combustion cylinder 81. The cylinder body 80 and the combustion cylinder 81 respectively performs primary combustion and secondary combustion of the fuel. The cylinder body 80 includes an external cylinder 82 and an internal cylinder 83 that have the same axis and are capable of rotating. The external cylinder 82 and the internal cylinder 83 have a double structure in which the external cylinder 82 covers and surrounds the internal cylinder 83 with a predetermined space being interposed therebetween. The internal space of the internal cylinder 83 is a primary combustion chamber 83C in which the primary combustion of fuel is performed. The cylinder-shaped combustion cylinder 81 is connected to an opening of the cylinder body 80. The internal space of the combustion cylinder 81 is a secondary combustion chamber 81C in which the secondary combustion of fuel is performed. The secondary combustion chamber 81C is a space to capture the fuel that has been subjected to the primary combustion in the primary combustion chamber 83C of the internal cylinder 83 and that is moved to the secondary combustion chamber 81C of the combustion cylinder 81, and to combust such captured fuel at a higher temperature (secondary combustion). The inner wall of the combustion cylinder 81 is covered by heat resistant material 81a so as to resist high-temperature combustion of fuel.

The space between the external cylinder 82 and the internal cylinder 83 is an air duct 85. An air vent 86 is provided in the air duct 85. The air vent 86 is connected to an air supply port 87a via an air supply path 87. External air is supplied to the air supply port 87a by rotation of an air blowing fan 88. Thus, the external air flows into the air duct 85 from the air supply port 87a via the air supply path 87 and the air vent 86. A plurality of air inlets 83a is formed in the outer periphery of the internal cylinder 83, and the air inlets 83a communicate with the air duct 85. Therefore, the air that passes through the air duct 85 flows through the air inlets 83a and thus is sent into the primary combustion chamber 83C of the internal cylinder 83.

On the other hand, the combustion cylinder 81 is provided with an air supply port 81b that penetrates the heat resistant material 81a so as to connect the secondary combustion chamber 81C to the outside. External air is supplied to the air supply port 81b by rotation of an air blowing fan 89. That is, the air is directly supplied to the secondary combustion chamber 81C from the air supply port 81b independently of (with no relation to) the air supplied to the primary combustion chamber 83C. When the amount of air that is directly supplied to the secondary combustion chamber 81C from the air supply port 81b is increased, the fuel after being subjected to the primary combustion can be combusted, as the secondary combustion in the secondary combustion chamber 81C, at a higher temperature with the high amount of air compared to the primary combustion in the primary combustion chamber 83C. Thus, the secondary combustion is optimally performed.

At the end opposite to the combustion cylinder 81 of the burner 8, the fuel supply path 90 is disposed, to which fuel is supplied. A fuel supply path 95 extending in the horizontal direction is connected to the fuel supply path 90, and the left end of the fuel supply path 95 (in FIG. 5) is communicated with the primary combustion chamber 83C of the internal cylinder 83. Also, the fuel supply path 95 is provided with a screw conveyor 96. A motor 97 is connected to the right end (in FIG. 5) of the screw conveyor 96 so as to rotationally drive the screw conveyor 96. By this rotational drive of the screw conveyor 96 with a plurality of blades 96a provided on the outer periphery of the screw conveyor 96, the fuel (dried product) supplied from the fuel supply path 90 is conveyed through the fuel supply path 95 to the primary combustion chamber 83C of the internal cylinder 83.

A motor 94 is provided on the side of the cylinder body 80 with respect to the fuel supply path 90. A cylinder part 96b of the screw conveyor 96 is connected to a drive shaft 94a of the motor 94 via two pulleys 99a and 99b and a belt 99c wrapped around the pulleys 99a and 99b. Thus, the cylinder part 96b of the screw conveyor 96 and the internal cylinder 83 are rotated by the motor 94. Since the internal cylinder 83 is thus rotated, the fuel in the primary combustion chamber 83C of the internal cylinder 83 is rotated and combusted. In this way, the fuel evenly makes contact with the air and the flame, which accelerates the primary combustion in the primary combustion chamber 83C. Bearings 98 allow the rotation movement of the cylinder part 96b of the screw conveyor 96.

In the burner 8 as described above, the fuel supplied from the fuel supply path 90 is conveyed to the primary combustion chamber 83C of the internal cylinder 83 via the fuel supply path 95 while the air flows into the primary combustion chamber 83C of the internal cylinder 83 from the air supply port 87a via the air duct 85 and the air inlets 83a. Thus, the fuel is subjected to the primary combustion by ignition of an igniter (not shown) provided in the primary combustion chamber 83C. During the primary combustion, the combustion temperature is increased to a predetermined temperature by the amount of air that flows through the air inlets 83a.

The fuel whose temperature has been increased to the predetermined temperature by the primary combustion moves to and flows into the secondary combustion chamber 81C of the combustion cylinder 81. Since the external air sent from the air supply port 81b flows into the secondary combustion chamber 81C, the fuel is further burned in the secondary combustion chamber 81C at a high temperature not less than 800° C. by this air. This combustion is a secondary combustion. The fuel is completely incinerated by the secondary combustion. Thus, no organic component remains, and inorganic waste is obtained.

In this way, in the burner 8, the fuel is completely combusted due to consecutiveness of the primary combustion in which the fuel is combusted in the primary combustion chamber 83C of the internal cylinder 83 and the secondary combustion in which the fuel is completely combusted, following the primary combustion, in the secondary combustion chamber 81C of the combustion cylinder 81. Thus, the organic waste is reliably incinerated to be transformed to inorganic waste.

Combustion Furnace

Figure 7:
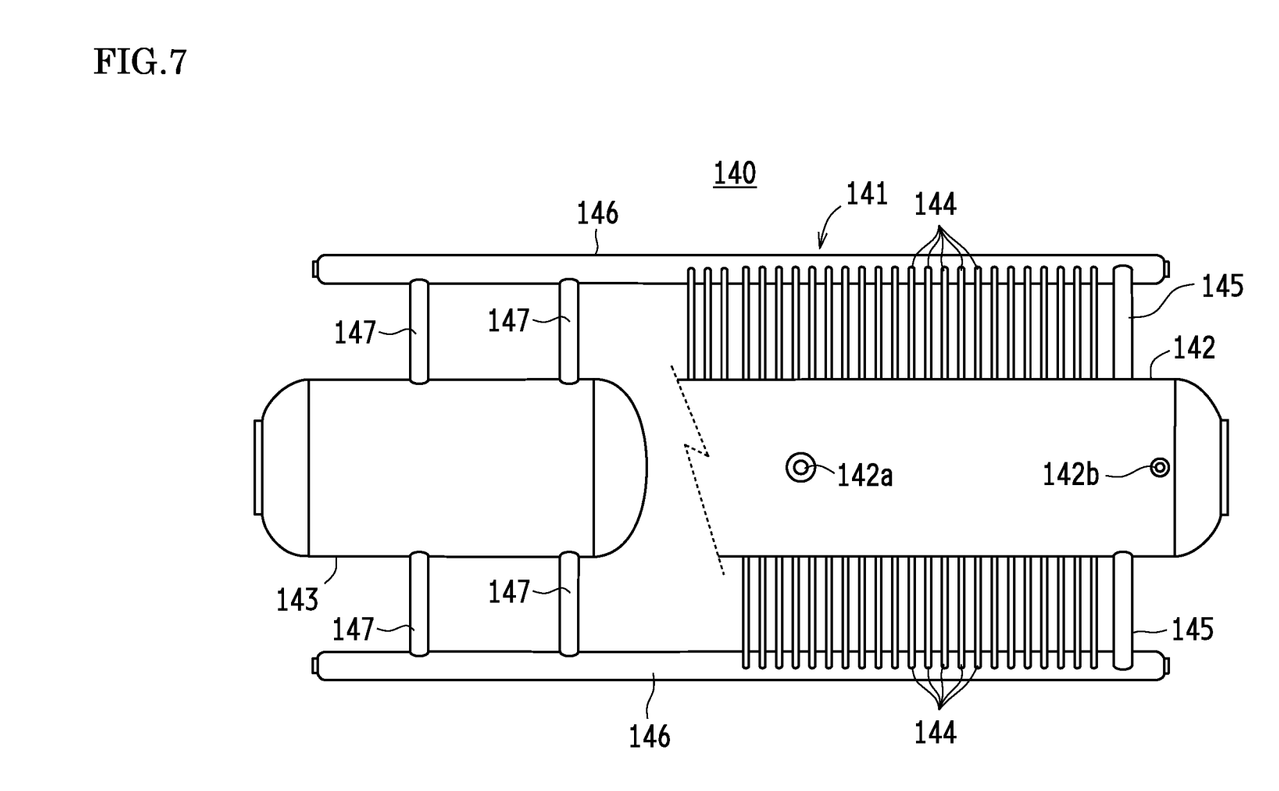
FIG. 7 is a front view illustrating an overall configuration of a heat exchanger provided in the boiler equipment.

Here, another configuration of the steam boiler 7 is described referring to FIGS. 4, 6 and 7. The combustion furnace 100 includes three thick walls (a front wall 110a, a back wall 110b and a bottom wall 110c). A large-volume internal space of the combustion furnace 100 is constituted of these three walls, left and right side walls 110d and 110e, and a roof wall 110f. Thus, the internal space has a rectangle shape viewed from the side. The height of the back wall 110b is about half the height of the front wall 110a. Behind the back wall 110b (on the left side in FIG. 4), a second back wall 110g is disposed. The second back wall 110g extends to the same height of the upper end of the front wall 110a. The lower end of the second back wall 110g is connected to the upper end of the back wall 110b via a second bottom wall 110*h*. Thus, a small-volume internal space is formed above the second bottom wall 110*h*. The small-volume internal space and the large-volume internal space constitute a combustion chamber 100F in the combustion furnace 100. For the sake of explanation, in the combustion chamber 100F, the internal space above the bottom wall 110*c* is hereinafter referred to as a "first combustion chamber 110F" while the internal space above the second bottom wall 110*h* is hereinafter referred to as a "second combustion chamber 120F". The walls 110*a* to 110*f* are made of, for example, refractory bricks that resist a high temperature of approximately 1000° C.

An opening 111 is formed in the lower part of the front wall 110*a*. The opening 111 is located at a center position between the left side wall 110*d* and the right side wall 110*e*. The burner 8 is directly connected to the opening 111 such that the secondary combustion chamber 81C of the combustion cylinder 81 of the burner 8 faces the first combustion chamber 110F of the combustion furnace 100. The opening shape of the opening 111 is made to have the same shape as the combustion cylinder 81 of the secondary combustion chamber 81C of the burner 8. Thus, the secondary combustion chamber 81C of the burner 8 is integrated with the combustion chamber 100F of the combustion furnace 100 via the opening 111, and the fuel is subjected to the secondary combustion both in the secondary combustion chamber 81C of the burner 8 and in the combustion chamber 100F (the first combustion chamber 110F and the second combustion chamber 120F) of the combustion furnace 100. The combustion temperature of the fuel is, for example, about 800° C. In FIG. 4, the flame generated by the combustion of the fuel in the first combustion chamber 110F is indicated by the reference sign "F".

A gas discharge port 120*a* that discharges exhaust gas of the fuel is formed in the second back wall 110*g* of the second combustion chamber 120F. The gas discharge port 120*a* is located at a center position between the left side wall 110*d* and the right side wall 110*e*. Thus, the exhaust gas generated by the secondary combustion in the secondary combustion chamber 81C of the burner 8 and in the combustion chamber 100F (the first combustion chamber 110F and the second combustion chamber 120F) of the combustion furnace 100 is discharged from the gas discharge port 120*a* of the second back wall 110*g*.

Heat Exchanger

The heat exchanger 140 provided on the combustion furnace 100 heats water using combustion energy generated by the combustion of the fuel in the combustion chamber 100F (the first combustion chamber 110F and the second combustion chamber 120F) of the combustion furnace 100 so as to generate hot temperature steam. The steam for heating generated by the heat exchanger 140 is supplied to the steam control device 92 via the steam path 70, and furthermore supplied from this steam control device 92 to the fermentation dryer 3 (e.g. the heating jacket 31 of the tank 30).

More specifically, the heat exchanger 140 includes: a water tube system 141; a steam-water drum 142; and a water drum 143. FIG. 7 is a front view illustrating the heat exchanger 140 extracted from the steam boiler 7 so as to indicate the connection relationship among the water tube system 141, the steam-water drum 142, and the water drum 143. In FIG. 7, the left part of the steam-water drum 142, which is located above the water drum 143, is omitted. Hereinafter, the configuration of the heat exchanger 140 is described referring to FIGS. 4, 6 and 7.

The water tube system 141 of the heat exchanger 140 includes a number of first water tubes 144. Water flows through the first water tubes 144, and evaporates by the combustion energy of the fuel in the first combustion chamber 110F and the second combustion chamber 120F. Each of the first water tubes 144 extends upward, from the position at the height of the upper part of the back wall 110*b*, along the respective inner surfaces of the two side walls 110*d* and 110*e*, as shown in FIG. 6. Each of the first water tubes 144 is further bent from the roof wall 110*f* toward the center part of the combustion furnace 100, and the upper end thereof is communicated with the steam-water drum 142. As can be seen from FIG. 6, in the combustion chamber 100F, the plurality of first water tubes 144 is disposed inside of a heat insulating material 114 provided on the respective inner walls of the two side walls (structural objects) 110*d* and 110*e*. Refractory bricks 115 are interposed between the plurality of first water tubes 144 and the heat insulating material 114.

The steam-water drum 142 is a drum having a circular cross-section into which steam flows. The steam is generated by evaporation of the water that passes through the first water tubes 144. The steam-water drum 142 is located at a center position between the left side wall 110*d* and the right side wall 110*e* and furthermore disposed so as to cover the first combustion chamber 110F and the second combustion chamber 120F. As shown in FIG. 4, the lower half of the steam-water drum 142 is located in the first combustion chamber 110F and the second combustion chamber 120F, and the upper half thereof is located above the roof wall 110*f*. A steam port 142*a* is opened in the center part of the steam-water drum 142 in the front and back direction. The steam accumulated in the steam-water drum 142 is supplied from the steam port 142*a* to the steam control device 92 via the steam path 70. In the front and back ends of the steam-water drum 142, respective windows 142*c* are disposed so as to confirm, for example, the ratio of the steam amount to the water amount in the inside.

In contrast, the water drum 143 is a drum having a circular cross-section in which the water to be supplied to the first water tubes 144 is stored. In the same way as the steam-water drum 142, the water drum 143 is located at a center position between the left side wall 110*d* and the right side wall 110*e*. Also, as can be seen from FIG. 4, the water drum 143 is disposed on the second bottom wall 110*h* only between the upper part of the back wall 110*b* and the lower part of the second back wall 110*g* (i.e. the position under the second combustion chamber 120F), that is, the water drum 143 is not located between the front wall 110*a* and the back wall 110*b*. A plurality of iron frames 148 is disposed in a space under the water drum 143, i.e. in an under space behind the first combustion chamber 110F (on the left side in FIG. 4). As shown in FIG. 6, the plurality of iron frames 148 supports the water drum 143 at the left and right lower ends of the second back wall 110*g*.

The water is supplied to the water drum 143 from the outside. The supply system of the water is now described as follows. Water supply ports 142*b* are respectively formed in the steam-water drum 142 at both ends in the front and back direction (in the left and right direction in FIG. 4). The water is supplied into the steam-water drum 142 from the water supply ports 142*b*. Two second water tubes 145 are respectively connected to the lower end surface of the steam-water drum 142. The two second water tubes 145 are disposed directly behind the front wall 110*a* in the first combustion chamber 110F, and respectively extend from the steam-water drum 142 toward the left and right side walls 110*d* and 110*e*

(in the vertical direction in FIG. 7), and further extend downward (see FIG. 4). Thus, the second water tubes 145 respectively have a substantially L-shape.

Furthermore, in the vicinity of the water drum 143, two third water tubes 146 are horizontally disposed at the height of the center portion of the water drum 143 in the front and back direction (in the left and right direction in FIG. 4). The third water tubes 146 respectively extend such that their frond ends (right ends in FIG. 7) are located slightly anterior to the second water tubes 145 and that their back ends are located in the vicinity of the back end of the water drum 143 (see FIG. 7). The lower ends of the two second water tubes 145 are respectively connected to the two third water tubes 146 at the positions near the front ends of the third water tubes 146. Also, the lower ends of the large number of first water tubes 144 provided on the inner wall of the combustion chamber 100F (the first combustion chamber 110F and the second combustion chamber 120F) are opened to the third water tubes 146. Furthermore, four fourth water tubes 147 (see FIG. 7) are connected to the back parts of the two third water tubes 146. The fourth water tubes 147 are also respectively connected to the water drum 143. The peripheries of the water drum 143 and the fourth water tubes 147 are covered by the heat insulating material 114.

Thus, the water supplied from the water supply ports 142b into the steam-water drum 142 is further conveyed to and temporarily stored in the water drum 143 via the second water tubes 145, the third water tubes 146 and the fourth water tubes 147. Meanwhile, the water also flows from the third water tubes 146 into the lower parts of the large number of first water tubes 144, and flows upward through the first water tubes 144. During passing upward through the first water tubes 144, the water receives the combustion energy of the fuel in the combustion chamber 100F (the first combustion chamber 110F and the second combustion chamber 120F) and thus transforms into steam. The steam is accumulated in the steam-water drum 142, and is supplied from the steam port 142a to the steam control device 92 via the steam path 70.

The steam control device 92 supplies part of the steam conveyed via the steam path 70 to the fermentation dryer 3 via the steam path 70 so as to heat the heating jacket 31 of the peripheral wall part of the tank 30 of the fermentation dryer 3. The steam control device 92 also supplies the remaining part of the conveyed steam to the steam electric generator 91.

The steam electric generator 91 is constituted, for example, of a steam turbine generator that generates electricity by the supplied steam. Part of the generated electric power is supplied to the fermentation dryer 3 so as to be used as drive power of the fermentation dryer 3. Also, the remaining part of the generated electric power is supplied to an electric power company.

In the combustion furnace 100, the gas discharge port 120a formed in the second back wall 110g is connected to a discharge path 150. On the discharge path 150, an economizer 151 is provided. The economizer 151 gives, in advance, thermal energy generated by exhaust gas discharged from the gas discharge port 120a of the second combustion chamber 120F to the water to be supplied to the steam-water drum 142 so that the temperature of the water is increased, for example, to 100° C.

Furthermore, the discharge path 150 changes its direction to the lateral direction downstream of the economizer 151. Although it is not shown in the drawings, the lateral discharge path 150 is provided with a bag filter, a water scrubber, a blower and the like. The bag filter collects fly ash in the exhaust gas that flows in the discharge path 150. The water scrubber jets water to remove, for example, chlorine components contained in the exhaust gas. A chimney (not shown) extending upward is connected to the lower end of the discharge path 150. The exhaust gas is emitted into the atmosphere through the chimney.

As described above, in this embodiment, the dried product obtained by the fermentation dryer 3 is supplied, as fuel, to the primary combustion chamber 83C of the burner 8 in the steam boiler 7. The dried product is heated in the primary combustion chamber 83C and the combustible content contained in the dried product is primarily combusted. The generated combustion gas is further combusted in a combustion space made by integration of the small-volume secondary combustion chamber 81C of the combustion cylinder 81 with the large-volume combustion chamber 100F (the first combustion chamber 110F and the second combustion chamber 120F) of the combustion furnace 100 via the opening 111. Thus, the secondary combustion is performed at the high temperature of about 800° C. with the large amount of air supplied from the air supply port 81b of the secondary combustion chamber 81C of the combustion cylinder 81. The combustion gas from the gas discharge port 120a of the second combustion chamber 120F is emitted into the atmosphere after passing through the economizer 151, the bag filter and the like.

Meanwhile, the water from the outside is heated in advance by receiving the thermal energy from the exhaust gas by the economizer 151 so that the temperature of the water reaches, for example, about 100° C. Then, the water is supplied from the water supply ports 142b to the steam-water drum 142 of the heat exchanger 140. The water further flows in the second water tubes 145 and the third water tubes 146, and part of the water is temporarily stored in the water drum 143. The remaining part of the water flows upward through the large number of first water tubes 144. At this time in the first water tubes 144, the water receives the thermal energy from the combustion gas flowing around the first water tubes 144 and transformed to the steam to flow into the steam-water drum 142. Thus flowing steam is accumulated in the steam-water drum 142 and is discharged from the steam port 142a so as to be supplied to the steam control device 92 via the steam path 70.

Here in the steam boiler 7, the burner 8 is directly connected to the front wall (wall part) 110a of the combustion furnace 100 so that the secondary combustion chamber 81C of the burner 8 faces the combustion chamber 100F of the combustion furnace 100 via the opening 111. Thus, the secondary combustion chamber 81C of the burner 8 and the combustion chamber 100F (the first combustion chamber 110F and the second combustion chamber 120F) of the combustion furnace 100 constitute an integrated combustion space made from both combustion chambers. Therefore, the fuel primarily combusted in the primary combustion chamber 83C of the burner 8 is further secondarily combusted with the large amount of air supplied from the air supply port 81b at a higher combustion temperature. Therefore, good combustion condition can be obtained, where almost no ash is generated.

In the heat exchanger 140 of the steam boiler 7, the water drum 143 is set to be located at a position above the opening 111 in the lower part of the vertical wall 110a, more specifically, at a position approximately half the height of the first combustion chamber 110F of the combustion furnace 100. The water tube system 141 (i.e. the first water tubes 144 to the fourth water tubes 147) is disposed only at a position not lower than the position of the water drum 143 in the height direction. In this way, the large number of first water tubes 144 are disposed at the upper part of the first combustion chamber 110F of the combustion furnace 100 while the opening 111 directly connected to the burner 8 is disposed in the lower part of the first combustion chamber 110F. Thus, the components of the steam boiler 7 are dispersedly disposed so as to simplify the overall layout while including the water drum 143 in the heat exchanger 140. As a result, it is possible to efficiently convert the combustion energy of fuel into steam using a sufficient amount of water.

Furthermore, the water supplied to the steam-water drum 142 of the heat exchanger 140 flows downward through the second water tubes 145, then horizontally flows in the third water tubes 146. Part of the water is stored in the water drum 143 via the fourth water tubes 147 while the remaining large part of water flows upward from the third water tubes 146 through the first water tubes 144. During passing upward through the first water tubes 144, the water receives the combustion energy of the fuel and evaporates so as to be accumulated as steam in the steam-water drum 142. Therefore, it is possible to give the combustion energy to the large amount of water in the combustion chamber 100F of the combustion furnace 100 without any water feed pump being provided in the heat exchanger 140, which results in efficient generation of steam.

In addition, in the combustion furnace 100, the opening 111 directly connected to the burner 8 is formed in the front wall 110a, and the gas discharge port 120a is formed in the second back wall 110g. Therefore, the combustion gas flows from the front end to the back end of the combustion furnace 100, and accordingly, the combustion energy of the fuel is converted into steam in the heat exchanger 140 while the whole combustion chamber 100F is effectively used. Particularly in this embodiment, since the opening 111 is disposed in the lower part of the front wall 110a and the gas discharge port 120a is disposed in the part close to the upper part of the combustion chamber 100F (specifically, in the second back wall 110g), the combustion gas, which comes from the opening 111 while becoming a swirling current, flows from the lower part to the upper part of the combustion chamber 100F, and then outflows backward through the gas discharge port 120a. Thus, the combustion energy of the fuel can be efficiently given to the large number of first water tubes 144.

Also, the burner 8 includes the primary combustion chamber 83C and the secondary combustion chamber 81C, and the air supply port 81b is provided so as to open to the secondary combustion chamber 81C. Therefore, apart from the amount of air supplied to the primary combustion chamber 83C, the air is also supplied from the air supply port 81b to the secondary combustion chamber 81C of the combustion cylinder 81 and the combustion chamber 100F (the first combustion chamber 110F and the second combustion chamber 120F) of the combustion furnace 100. Therefore, the secondary combustion is performed at a high temperature in the secondary combustion chamber 81 of the burner 8 and the combustion chamber 100F of the combustion furnace 100 that forms the integrated space with the secondary combustion chamber 81C. As a result, the secondary combustion is optimally performed.

Furthermore, in the burner 8 of the steam boiler 7, the dried product subjected to the fermentation drying under reduced pressure by the fermentation dryer 3 is supplied, as fuel, to the primary combustion chamber 83C. Thus, the dried product can be combusted and incinerated in the steam boiler 7, and accordingly, there is no need to have the step of waste disposal.

In addition, in the steam boiler 7, the steam accumulated in the steam-water drum 142 is supplied from the steam port 142a to the steam control device 92 via the steam path 70, and after that, the steam is supplied to the steam electric generator 91 so as to be used for generating electricity by the steam electric generator 91. Part of the electric power obtained by the electric generation is supplied to the fermentation dryer 3 so as to be used for driving the fermentation dryer 3. Thus, the costs for driving the fermentation dryer 3 can be reduced.

In this embodiment, the burner including the primary combustion chamber 83C and the secondary combustion chamber 81C is adopted as the burner 8. However, the burner may include only one combustion chamber. In this case, the burner may be directly connected to a front wall 100a such that the one combustion chamber of the burner faces the combustion chamber 100F of the combustion furnace 100.

Also, the opening 111 is formed in the front wall 100a of the combustion furnace 100. However, the opening 111 may be formed in another wall part such as the bottom wall 110c.

Furthermore, the steam boiler 7 has a configuration in which the dried product obtained by the fermentation dryer 3 is combusted in the organic waste treatment system 1. However, the steam boiler 7 may be applied to boiler equipment for combusting another substance.

The foregoing embodiment is to be considered in all respects as illustrative and not limiting. The technical scope of the invention is indicated by the appended claims rather than by the foregoing embodiment, and all modifications and changes that come within the meaning and range of equivalency of the claims are intended to be embraced therein.

INDUSTRIAL APPLICABILITY

The present invention is suitably applied to a boiler equipment with improved combustion efficiency and an organic waste treatment system including the boiler equipment.

DESCRIPTION OF THE REFERENCE NUMERALS

1 Organic waste treatment system
3 Fermentation dryer
30 Tank (airtight container)
7 Steam boiler (boiler equipment)
8 Burner (combustion device)
80 Cylinder body
81 Combustion cylinder
81C Secondary combustion chamber (combustion chamber)
83C Primary combustion chamber
91 Steam electric generator
100 Combustion furnace
100F Combustion chamber
110a Front wall (vertical wall, wall part)
110b First back wall
110g Second back wall (opposite vertical wall)
110F First combustion chamber
120a Gas discharge port
120F Second combustion chamber
111 Opening
140 Heat exchanger 141 Water tube system
142 Steam-water drum
143 Water drum
144 First water tube
145 Second water tube
146 Third water tube
147 Fourth water tube

The invention claimed is:

1. Boiler equipment comprising:
a combustion device including a combustion chamber to combust fuel supplied to the combustion device;
a combustion furnace including a combustion chamber formed inside thereof; and
a heat exchanger transferring thermal energy obtained by combustion of the fuel in the combustion device to water, wherein:
the combustion device is directly connected to a wall part of the combustion furnace such that the combustion chamber of the combustion device faces the combustion chamber of the combustion furnace;
the heat exchanger includes:
a steam-water drum disposed above the combustion chamber of the combustion furnace;
a water drum disposed at a position higher than an opening part of the wall part of the combustion furnace, the opening part to which the combustion chamber of the combustion device is opened; and
a water tube system in which a first end part thereof is connected to the steam-water drum while a second end part thereof is connected to the water drum at the position of the water drum in a height direction;
and the water tube system includes:
a plurality of first water tubes provided on an inner wall surface of the combustion chamber of the combustion furnace so as to extend vertically;
second water tubes through which water supplied from an outside to the steam-water drum flows downward;
third water tubes horizontally provided at the position of the water drum in the height direction so as to flow the water that has flowed through the second water tubes to the first water tubes; and
fourth water tubes through which part of the water that has flowed through the third water tubes further flows to the water drum.

2. The boiler equipment according to claim 1, wherein
the combustion device is directly connected to a vertical wall of the combustion furnace,
in the wall part of the combustion furnace, a gas discharge port is formed in a vertical wall opposite to the vertical wall to which the combustion device is directly connected, and
the gas discharge port discharges exhaust gas generated by combustion in the combustion chamber of the combustion furnace.

3. The boiler equipment according to claim 1, wherein
the combustion chamber of the combustion device includes:
a primary combustion chamber in which the fuel supplied is subjected to primary combustion;
a secondary combustion chamber in which the fuel that has been subjected to the primary combustion in the primary combustion chamber is subjected to secondary combustion; and
an air supply port through which air is supplied to the secondary combustion chamber independently of air supplied to the primary combustion chamber.

4. An organic waste treatment system comprising:
the boiler equipment according to claim 1; and
a fermentation dryer configured to: store an object to be treated, which contains organic waste, in an airtight container; heat and stir the object to be treated under reduced pressure so that a temperature of the object to be treated is within a predetermined temperature range; ferment organic matter using microorganisms; and obtain volume-reduced dried product, an odor component of which has been decomposed, wherein
the dried product obtained by the fermentation dryer is supplied, as fuel, to the combustion chamber of the combustion device in the boiler equipment.

5. The organic waste treatment system according to claim 4 further comprising a steam electric generator that generates electricity by steam extracted from the steam-water drum of the boiler equipment, wherein
the fermentation dryer is driven by the electricity obtained by the steam electric generator.

* * * * *